United States Patent [19]
Terazawa et al.

[11] Patent Number: 6,065,815
[45] Date of Patent: May 23, 2000

[54] ANTILOCK BRAKE SYSTEM AND AUXILIARY HYDRAULIC PRESSURE SOURCE DEVICE FOR ANTILOCK BRAKE SYSTEM

[75] Inventors: Tadashi Terazawa; Michiharu Nishii, both of Toyota, Japan

[73] Assignee: Aisin Seiki Kabushiki Kaisha, Kariya, Japan

[21] Appl. No.: 09/066,655

[22] Filed: Apr. 27, 1998

[30] Foreign Application Priority Data

Apr. 25, 1997 [JP] Japan ................................. 9-108634

[51] Int. Cl.⁷ .................................................. B60T 13/14
[52] U.S. Cl. ..................................... 303/116.2; 303/114.1
[58] Field of Search ............................... 303/3, 10, 9.62, 303/113.2, 114.1, 116.1, 116.2

[56] References Cited

U.S. PATENT DOCUMENTS

| | | | |
|---|---|---|---|
| 5,015,045 | 5/1991 | Nishii .................................. | 303/114.1 |
| 5,249,853 | 10/1993 | Reinartz et al. ..................... | 303/114.1 |
| 5,393,131 | 2/1995 | Nomura et al. ...................... | 303/186 |
| 5,484,194 | 1/1996 | Reinartz et al. ..................... | 303/116.2 |
| 5,540,488 | 7/1996 | Terazawa et al. ................... | 303/113.2 |
| 5,624,164 | 4/1997 | Tozu et al. ........................... | 303/9.62 |
| 5,791,745 | 8/1998 | Sakakibara .......................... | 303/113.4 |

FOREIGN PATENT DOCUMENTS

| | | |
|---|---|---|
| 60-38243 | 2/1985 | Japan . |
| 1-109158 | 4/1989 | Japan . |

*Primary Examiner*—Chris Schwartz
*Attorney, Agent, or Firm*—Burns, Doanne, Swecker & Mathis, LLP

[57] ABSTRACT

An auxiliary hydraulic pressure source device for use with an antilock brake system in a vehicle includes an accumulator that can be reduced in size without deteriorating the performance of the vehicle brakes. The auxiliary hydraulic pressure source device also includes a hydraulic pump for delivering brake fluid into a high-pressure brake fluid output line. A first one-way valve connects this output line with the accumulator only when the hydraulic pressure inside the output line exceeds the hydraulic pressure inside the accumulator by more than a given value $\Delta P$. A second one-way valve connects the accumulator with the output line only when the hydraulic pressure inside the output line is lower than the hydraulic pressure inside the accumulator.

20 Claims, 2 Drawing Sheets

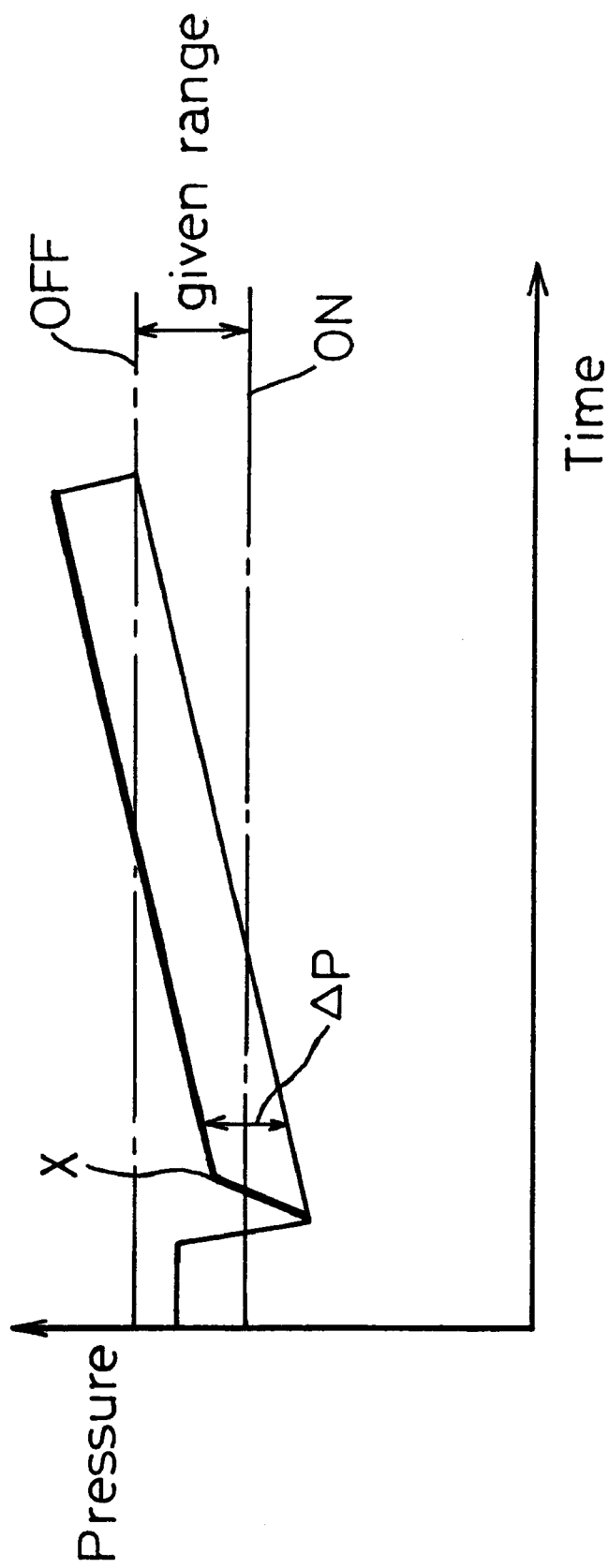

ANTILOCK BRAKE SYSTEM AND AUXILIARY HYDRAULIC PRESSURE SOURCE DEVICE FOR ANTILOCK BRAKE SYSTEM

This application corresponds to and claims priority under 35 U.S.C. § 119 with respect to Japanese Application No. 09(1997)-108634 filed on Apr. 25, 1997, the entire content of which is incorporated herein by reference.

FIELD OF THE INVENTION

The present invention generally relates to an automotive antilock brake system. More particularly, the present invention pertains to an auxiliary hydraulic pressure source device used in an automotive antilock brake system for applying brake fluid to the wheel cylinders after adjusting the pressure of the brake fluid in an accumulator to correspond to the driver's efforts.

BACKGROUND OF THE INVENTION

Unexamined Published Japanese Patent Application No. H1-109158 discloses an antilock brake system (ABS) equipped with an auxiliary hydraulic pressure source device provided with an accumulator that stores high-pressure brake fluid. A hydraulic booster operating with this high-pressure brake fluid actuates a tandem master cylinder. A hydraulic brake pressure control valve is mounted between the tandem master cylinder and one wheel cylinder, while a similar hydraulic brake pressure control valve is interposed between the tandem master cylinder and another one of the wheel cylinders. When skid control is activated, the inlets of the hydraulic brake pressure control valves that are connected with the master cylinder are placed in communication with the working chamber of the hydraulic booster. Thus, brake fluid under pressure is sent from the working chamber of the hydraulic booster to the wheel cylinders.

Unexamined Published Japanese Patent Application No. S60-38243 discloses another antilock brake system (ABS) equipped with an auxiliary hydraulic pressure source device having an accumulator that stores high-pressure brake fluid. A hydraulic booster operating with this high-pressure brake fluid actuates a master cylinder and brake fluid under pressure is supplied from the master cylinder to the wheel cylinders of the nondriving wheels. Brake fluid under pressure is supplied from the working chamber of the hydraulic booster to the wheel cylinders of the drive wheels. The brake fluid under pressure is supplied to the wheel cylinders of the drive wheels from the working chamber of the hydraulic booster. A hydraulic brake pressure control valve is mounted between the master cylinder and the wheel cylinders of the nondriving wheels. A similar hydraulic brake pressure control valve is also interposed between the working chamber of the hydraulic booster and the wheel cylinders of the drive wheels.

The auxiliary hydraulic pressure source device described in the above-cited Unexamined Published Japanese Patent Application No. H1-109158 includes a high-pressure brake fluid output line that communicates with the accumulator, a reservoir which stores low-pressure brake fluid, a hydraulic pump which elevates the pressure of the low-pressure brake fluid in the reservoir and pumps the brake fluid to the high-pressure fluid output line, and a hydraulic pump driving device (e.g., an electric motor) that drives the hydraulic pump. A control device maintains the hydraulic pressure inside the accumulator by effecting on and off operation of the hydraulic pump in response to variations in the hydraulic pressure in the accumulator.

In a vehicle equipped with an antilock brake system having the auxiliary hydraulic pressure source device of the construction described above, if hard braking takes place on dry asphalt pavement, high-pressure brake fluid stored in the accumulator is consumed at a very high rate at the initial stage of the braking action. The result is that the hydraulic pressure in the accumulator and the high-pressure brake fluid output line through which high-pressure brake fluid is fed to the hydraulic booster drops very rapidly down to a very small level.

Where the accumulator, the hydraulic pump, and the hydraulic pump-driving device are made to be smaller in size so that the auxiliary hydraulic pressure source device is more conveniently mounted in a vehicle, the hydraulic pressure in the high-pressure brake fluid output line drops very rapidly to a very small level. As a result, the pressure becomes lower than the hydraulic brake pressure value at which the wheels are locked. The hydraulic pressure value in the high-pressure brake fluid output line at which the operation of the hydraulic pump is started is normally set higher than the hydraulic brake pressure at which the wheels are locked on a dry asphalt pavement. The hydraulic pump is driven in response to large drops in the hydraulic pressure inside the high-pressure brake fluid output line. The pump pressurizes the low-pressure brake fluid in the reservoir and begins pumping this fluid to the high-pressure brake fluid output line. Because the high-pressure brake fluid output line is in communication with the accumulator, the brake fluid supplied from the hydraulic pump to the high-pressure brake fluid output line flows into the accumulator from the beginning. It thus takes a relatively long time before the hydraulic pressure in the high-pressure brake fluid output line reaches the hydraulic brake pressure at which the wheels are locked. If skid control is started before the hydraulic pressure inside the high-pressure brake fluid output line reaches the hydraulic brake pressure at which the wheels are locked, the pressure is again increased but with a delay after the brake fluid pressure inside the wheel cylinders is decreased. Consequently, a large deceleration cannot be obtained. Hence, the performance of the brakes deteriorates. Accordingly, with the above-described auxiliary hydraulic pressure source device, the capacity of the accumulator is set to be large in an attempt to increase without delay the hydraulic brake pressure inside the wheel cylinders, even if hard braking takes place on a dry asphalt pavement, and if skid control is immediately started. As a result, the above-described auxiliary hydraulic pressure source device is rather large in size and cannot be conveniently mounted in a vehicle.

In light of the foregoing, a need exists for an auxiliary hydraulic pressure source device that is free of the foregoing problems, drawbacks and disadvantages.

It would thus be desirable to provide an auxiliary hydraulic pressure source device that is able to increase without delay the hydraulic brake pressure inside the wheel cylinders, even if hard braking takes place on a dry asphalt pavement and if skid control is immediately started.

It would also be desirable to provide an auxiliary hydraulic pressure source device that is able to achieve such a result without excessively increasing the size of the device and while still allowing the auxiliary hydraulic pressure source device to be conveniently mounted within a vehicle.

SUMMARY OF THE INVENTION

In light of the foregoing, the present invention provides an auxiliary hydraulic pressure source device for use with a vehicle antilock brake system. The auxiliary hydraulic pressure source device is provided with an accumulator that stores high-pressure brake fluid, with the pressure of the brake fluid being adjusted to correspond to the driver's efforts. The brake fluid whose pressure has been adjusted is the used to apply hydraulic brake pressure to the wheel cylinders. In addition to the accumulator, the auxiliary hydraulic pressure source device includes a high-pressure brake fluid output line, a reservoir which stores low-pressure brake fluid, a hydraulic pump which pressurizes the low-pressure brake fluid inside the reservoir and supplies the pressurized brake fluid to the high-pressure brake fluid output line, a hydraulic pump-driving device which drives the hydraulic pump, and a controller which is designed to maintain the hydraulic pressure inside the accumulator within a given range by driving the hydraulic pump-driving device on and off in response to variations in the hydraulic pressure inside the accumulator. The auxiliary hydraulic pressure source device further includes a first one-way valve and a second one-way valve. The first one-way valve permits brake fluid to pass from the high-pressure brake fluid output line into the accumulator only when the hydraulic pressure inside the high-pressure brake fluid output line is higher than the hydraulic pressure inside the accumulator by more than a given value. The second one-way valve permits the brake fluid to flow from the accumulator to the high-pressure brake fluid output line only when the hydraulic pressure in the high-pressure brake fluid output line is lower than the hydraulic pressure in the accumulator.

With the auxiliary hydraulic pressure source device constructed according to the present invention, if hard braking takes place on a dry asphalt pavement, for example, and if skid control is immediately started, the high-pressure brake fluid stored in the accumulator is supplied from the high-pressure brake fluid output line to the brake system through the second one-way valve. The hydraulic pump is driven in response to relatively significant decreases in the hydraulic pressure inside the high-pressure output line. The pump pressurizes the low-pressure brake fluid in the reservoir and begins to supply the brake fluid to the high-pressure brake fluid output line. The first one-way valve inhibits the flow of brake fluid from the high-pressure brake fluid output line to the accumulator until the hydraulic pressure inside the high-pressure brake fluid output line is higher than the hydraulic pressure inside the accumulator by more than a given value. Therefore, the brake fluid supplied to the high-pressure brake output line by the hydraulic pump is fully used to increase the hydraulic pressure inside the wheel cylinders again. As a result, the pressure of the brake fluid inside the wheel cylinders is quickly increased again. The brake fluid is stored in the accumulator via the first one-way valve when the amount of the brake fluid used for controlling the hydraulic brake pressure inside the wheel cylinders is less than the amount of the fluid delivered by the hydraulic pump. Hence, the capacity of the accumulator can be set smaller than would otherwise be the case.

According to another aspect of the present invention, an antilock brake system for an automotive vehicle includes a plurality of wheel cylinders, a reservoir for storing low-pressure brake fluid, an accumulator for storing high-pressure brake fluid, a high-pressure brake fluid output line connected to the wheel cylinders and adapted to communicate with the accumulator, and a pump connected to the reservoir and the high-pressure brake fluid output line for pressurizing the low-pressure brake fluid in the reservoir and supplying pressurized brake fluid to the high-pressure brake fluid output line during operation of the pump. An arrangement is also provided for preventing flow of pressurized brake fluid in the high-pressure brake fluid output line into the accumulator during operation of the pump until the hydraulic pressure inside the high-pressure brake fluid output line exceeds the hydraulic pressure in the accumulator by a predetermined amount so that the pressurized brake fluid produced by operation of the pump is supplied to at least one of the wheel cylinders while being prevented from flowing into the accumulator and for permitting flow of pressurized brake fluid in the high-pressure brake fluid output line into the accumulator during operation of the pump when the hydraulic pressure inside the high-pressure brake fluid output line exceeds the hydraulic pressure in the accumulator by the predetermined amount.

Another aspect of the invention involves an auxiliary hydraulic pressure source device for use with an antilock brake system for adjusting the pressure of high-pressure brake fluid to correspond to a driver's input and for applying hydraulic brake pressure to wheel cylinders using the brake fluid whose pressure has been adjusted. The auxiliary hydraulic pressure source device includes an accumulator which stores high-pressure brake fluid, a high-pressure brake fluid output line adapted to communicate with the accumulator, a reservoir which stores low-pressure brake fluid, and a pump connected to the reservoir and the high-pressure brake fluid output line for pressurizing the low-pressure brake fluid in the reservoir and supplying pressurized brake fluid to the high-pressure brake fluid output line during operation of the pump. An arrangement is also provided for preventing the flow of pressurized brake fluid in the high-pressure brake fluid output line into the accumulator during operation of the pump until hydraulic pressure inside the high-pressure brake fluid output line exceeds the hydraulic pressure in the accumulator by a predetermined amount and for permitting the flow of pressurized brake fluid in the high-pressure brake fluid output line into the accumulator during operation of the pump when the hydraulic pressure inside the high-pressure brake fluid output line exceeds the hydraulic pressure in the accumulator by the predetermined amount.

BRIEF DESCRIPTION OF THE DRAWING FIGURES

The foregoing and additional features of associated with the present invention will become more apparent from the following detailed description considered with reference to the accompanying drawing figures in which like elements are designated by like reference numerals and wherein:

FIG. 1 is a block diagram of an auxiliary hydraulic pressure source device in accordance with the present invention for use with a vehicle antilock brake system; and FIG. 2 is a graph illustrating the hydraulic pressure inside the accumulator of the auxiliary hydraulic pressure source device shown in FIG. 1 and the hydraulic pressure inside the high-pressure brake fluid output line plotted against time when the hydraulic booster is in operation.

DETAILED DESCRIPTION OF THE PREFERRED EMBODIMENT

Figure 1:
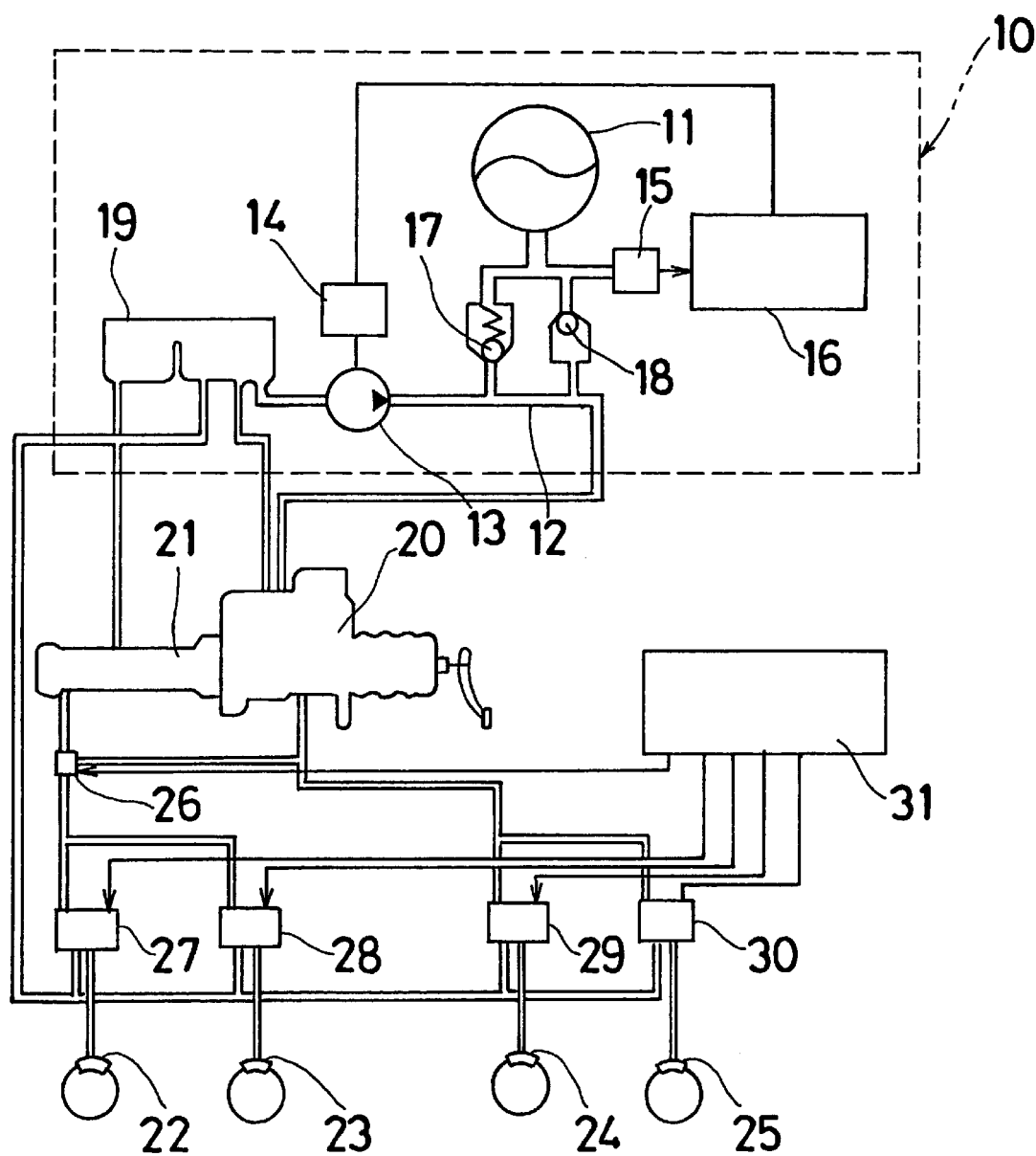

Referring initially to FIG. 1, an auxiliary hydraulic pressure source device 10 according to the present invention is adapted to be used with an antilock brake system in a vehicle. This auxiliary hydraulic pressure source device 10 includes an accumulator 11, a high-pressure brake fluid output line 12, a reservoir 19 for storing low-pressure brake fluid, and a hydraulic pump 13 connected to the reservoir 19 for increasing the pressure of the low-pressure brake fluid inside the reservoir 19 and for supplying the brake fluid to the high-pressure brake fluid output line 12. The auxiliary hydraulic pressure source device 10 also includes an electric motor 14 for driving the hydraulic pump 13, a hydraulic pressure sensor 15 for detecting the hydraulic pressure inside the accumulator 11, and an electrical control unit 16 for maintaining the hydraulic pressure inside the accumulator 11 within a given range by driving the motor 14 on and off in response to variations in the hydraulic pressure inside the accumulator 11 detected by the hydraulic pressure sensor 15.

The auxiliary hydraulic pressure source device 10 further includes a first one-way valve 17 and a second one-way valve 18. The first one-way valve 17 permits brake fluid to flow from the high-pressure brake fluid output line 12 to the accumulator 11 only when the hydraulic pressure in the high-pressure brake fluid output line 12 exceeds the hydraulic pressure inside the accumulator 11 by more than a given value ΔP. The second one-way valve 18 allows brake fluid to pass from the accumulator 11 to the high-pressure brake fluid output line 12 when the hydraulic pressure inside the high-pressure brake fluid output line 12 is lower than the hydraulic pressure inside the accumulator 11. The brake fluid delivered by the hydraulic pump 13 into the high-pressure brake fluid output line 12 is able to flow into the accumulator 11 only through the first one-way valve 17. The brake fluid in the accumulator 11 is able to flow into the high-pressure brake fluid output line 12 only through the second one-way valve 18.

The high-pressure brake fluid output line 12 is in communication with the inlet of a hydraulic pressure booster 20. This hydraulic pressure booster 20 adjusts the pressure of the high-pressure brake fluid supplied from the high-pressure brake fluid output line 12 so as to correspond to the driver's efforts (i.e., the driver's input applied to the brake pedal). The brake fluid whose pressure has been adjusted in this way activates a master cylinder 21.

The master cylinder 21 supplies pressurized brake fluid corresponding to the output from the hydraulic pressure booster 20 to the wheel cylinders 22, 23 of the front wheel brake mechanisms. Also, brake fluid under pressure is supplied from the working chamber of the hydraulic pressure booster 20 to the wheel cylinders 24, 25 of the rear wheel brake mechanisms.

A brake fluid pressure control valve 29 is mounted in the conduit that directs brake fluid under pressure from the working chamber of the hydraulic booster 20 to the wheel cylinder 24. The brake fluid pressure control valve 29 adjusts the brake fluid pressure in the wheel cylinder 24. A brake fluid pressure control valve 30 is also mounted in the conduit that directs brake fluid under pressure from the working chamber of the hydraulic booster 20 to the wheel cylinder 25. The brake fluid pressure control valve 30 adjusts the brake fluid pressure in the wheel cylinder 25.

A brake fluid pressure control valve 27 is disposed in the conduit that directs brake fluid under pressure from the master cylinder 21 to the wheel cylinder 22 for adjusting the brake fluid pressure in the wheel cylinder 22. Also, a brake fluid pressure control valve 28 is disposed in the conduit that directs brake fluid under pressure from the master cylinder 21 to the wheel cylinder 23 for adjusting the brake fluid pressure in the wheel cylinder 23. A selector valve 26 is positioned in the line connecting the master cylinder 21 to the control valves 27, 28. The selector valve 26 is also connected to the hydraulic booster 20. The selector valve 26 is designed to switch the connection of the control valves 27, 28 from the master cylinder 21 to the working chamber of the hydraulic pressure booster 20 during skid control.

The selector valves 26 and the hydraulic brake pressure control valves 27, 28, 29, 30 are operated by the electric control unit 31 according to the degree of skid of the wheels.

The graph of FIG. 2 shows the variations in the hydraulic pressure in the high-pressure brake fluid output line 12 and the variations in the hydraulic pressure inside the accumulator 11 when the hydraulic booster 20 is in operation. In the graph shown in FIG. 2, the thicker solid line indicates the hydraulic pressure in the high-pressure brake fluid output line 12 while the thinner line indicates the hydraulic pressure inside the accumulator 11. The point X in the graph of FIG. 2 identifies the time at which the valve 17 opens. The horizontal lines in the graph of FIG. 2 identify when the pump 13 is turned on (i.e., the lowermost horizontal line) and off (i.e., the uppermost horizontal line).

When the hydraulic booster 20 is in operation while the hydraulic pressure inside the accumulator 11 lies within a given range and the hydraulic pump 13 is at rest (i.e., is off), the hydraulic pressure inside the high-pressure brake fluid output line 12 drops. The high-pressure brake fluid inside the accumulator 11 then flows through the one-way valve 18 into the hydraulic booster 20. Thus, the hydraulic pressure inside the accumulator 11 decreases below the lower limit of the given range and is sensed by the pressure sensor 15. The hydraulic pump 13 then begins to operate. The operation of the hydraulic pump 13 is controlled through use of the control unit 16 to begin operation when the hydraulic pressure inside the accumulator 11 falls below the lower limit of the given range. When the pump 13 begins delivering brake fluid into the high-pressure brake fluid output line 12, the hydraulic pressure inside the high-pressure brake fluid output line 12 becomes larger than the hydraulic pressure inside the accumulator 11 by a given value ΔP. Under this condition, the brake fluid in the high-pressure brake fluid output line 12 flows into the accumulator 11 through the one-way valve 17. This increases the hydraulic pressure inside the accumulator 11 and the hydraulic pressure inside the high-pressure brake fluid output line 12. If skid control is started immediately after operation of the hydraulic booster 20, the brake fluid delivered by the pump 13 is used preferentially for the control of the hydraulic pressure in the wheel cylinders 22, 23, 24, 25. The difference between the amount of liquid delivered by the pump 13 and the amount used for the control of the hydraulic pressure in the wheel cylinders 22, 23, 24, 25 flows into the accumulator 11.

From the foregoing, it can be seen that the first one-way valve 17 inhibits or prevents the flow of brake fluid from the high-pressure brake fluid output line 12 into the accumulator 11 until the hydraulic pressure inside the high-pressure brake fluid output line 12 is higher than the hydraulic pressure inside the accumulator 11 by more than a given value. Therefore, the brake fluid supplied to the high-pressure brake output line 12 by the hydraulic pump 13 is fully and solely used to increase the hydraulic pressure inside the wheel cylinders. This is quite advantageous in that the pressure of the brake fluid inside the wheel cylinders is quickly increased once again. The brake fluid is stored in the accumulator 11 by way of the first one-way valve when the amount of the brake fluid used for controlling the hydraulic brake pressure inside the wheel cylinders is less than the amount of the fluid delivered by the hydraulic pump 13. Hence, the accumulator 11 can advantageously be constructed to have a smaller capacity than would otherwise be the case.

It can thus be seen that in the auxiliary hydraulic pressure source according to the present invention, the hydraulic brake pressure inside the wheel cylinders can be increased without delay, even if hard braking takes place on a dry asphalt pavement and skid control is immediately started. Also, the auxiliary hydraulic pressure source according to the present invention can be made rather small which means that the device can be rather conveniently mounted in a vehicle. It is thus possible by virtue of the present invention to reduce the size of the auxiliary hydraulic pressure source device for use in an antilock brake system while still maintaining the performance of the brakes.

The principles, a preferred embodiment and a mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An antilock brake system for an automotive vehicle comprising:

a plurality of wheel cylinders;

a reservoir for storing low-pressure brake fluid;

an accumulator for storing high-pressure brake fluid;

a high-pressure brake fluid output line connected to the wheel cylinders and adapted to communicate with the accumulator;

a pump connected to said reservoir and said high-pressure brake fluid output line for pressurizing the low-pressure brake fluid in the reservoir and supplying pressurized brake fluid to said high-pressure brake fluid output line during operation of said pump;

means for preventing flow of pressurized brake fluid in the high-pressure brake fluid output line into the accumulator during operation of the pump until hydraulic pressure inside the high-pressure brake fluid output line exceeds the hydraulic pressure in the accumulator by a predetermined amount so that the pressurized brake fluid produced by operation of the pump is supplied to at least one of the wheel cylinders while being prevented from flowing into the accumulator and for permitting flow of pressurized brake fluid in the high-pressure brake fluid output line into the accumulator during operation of the pump when the hydraulic pressure inside the high-pressure brake fluid output line exceeds the hydraulic pressure in the accumulator by said predetermined amount.

2. An antilock brake system for an automotive vehicle according to claim 1, wherein said means includes a first one-way valve disposed between said accumulator and said high-pressure brake fluid output line, said one-way valve permitting flow of pressurized brake fluid in said high-pressure brake fluid output line to said accumulator only when the hydraulic pressure in the high-pressure brake fluid output line exceeds the hydraulic pressure in the accumulator by said predetermined amount.

3. An antilock brake system for an automotive vehicle according to claim 2, including a second one-way valve disposed between said high-pressure brake fluid output line and said accumulator for permitting passage of brake fluid from said accumulator to said high-pressure brake fluid output line when the hydraulic pressure inside said high-pressure brake fluid output line is lower than the hydraulic pressure inside said accumulator.

4. An antilock brake system for an automotive vehicle according to claim 1, including a one-way valve disposed between said high-pressure brake fluid output line and said accumulator for permitting passage of brake fluid from said accumulator to said high-pressure brake fluid output line when the hydraulic pressure inside said high-pressure brake fluid output line is lower than the hydraulic pressure inside said accumulator.

5. An antilock brake system for an automotive vehicle according to claim 1, including a pump driving device connected to said pump for driving said pump.

6. An antilock brake system for an automotive vehicle according to claim 1, including a hydraulic pressure booster positioned between said high-pressure brake fluid output line and said at least one wheel cylinder for adjusting the pressure of the pressurized brake fluid in said high-pressure brake fluid output line to correspond to a driver's input applied to a brake pedal.

7. An antilock brake system for an automotive vehicle according to claim 6, including a master cylinder connected to the hydraulic pressure booster, the master cylinder being connected to said reservoir and at least one of said wheel cylinders.

8. An antilock brake system for an automotive vehicle according to claim 1, including a sensor operatively associated with the accumulator for determining the hydraulic pressure inside said accumulator.

9. An auxiliary hydraulic pressure source device for use with an antilock brake system for adjusting a pressure of high-pressure brake fluid to correspond to a driver's input and for applying hydraulic brake pressure to wheel cylinders using the brake fluid whose pressure has been adjusted, said auxiliary hydraulic pressure source device comprising:

an accumulator for storing high-pressure brake fluid;

a high-pressure brake fluid output line;

a reservoir for storing low-pressure brake fluid;

a hydraulic pump connected to said reservoir and said high-pressure brake fluid output line for pressurizing the low-pressure brake fluid in the reservoir and supplying pressurized brake fluid to said high-pressure brake fluid output line;

a hydraulic pump-driving device connected to said hydraulic pump for driving said hydraulic pump;

control means for maintaining the hydraulic pressure inside said accumulator within a given range by driving said hydraulic pump-driving device on and off in response to variations in the hydraulic pressure inside said accumulator;

a first one-way valve disposed between said high-pressure brake fluid output line and said accumulator for permitting passage of brake fluid from said high-pressure brake fluid output line to said accumulator only when the hydraulic pressure inside said high-pressure brake fluid output line exceeds the hydraulic pressure inside said accumulator by more than a given value; and a second one-way valve disposed between said high-pressure brake fluid output line and said accumulator for permitting passage of brake fluid from said accumulator to said high-pressure brake fluid output line when the hydraulic pressure inside said high-pressure brake fluid output line is lower than the hydraulic pressure inside said accumulator.

10. An auxiliary hydraulic pressure source device according to claim 1, including a sensor operatively associated with the accumulator for determining the hydraulic pressure inside said accumulator, said sensor being connected to said control means and receiving a signal from the sensor indicating the hydraulic pressure inside said accumulator for controlling operation of the hydraulic pump-driving device.

11. An auxiliary hydraulic pressure source device for use with an antilock brake system for adjusting a pressure of high-pressure brake fluid to correspond to a driver's input and for applying hydraulic brake pressure to wheel cylinders using the brake fluid whose pressure has been adjusted, said auxiliary hydraulic pressure source device comprising:

an accumulator for storing high-pressure brake fluid;

a high-pressure brake fluid output line adapted to communicate with said accumulator;

a reservoir for storing low-pressure brake fluid;

a pump connected to said reservoir and said high-pressure brake fluid output line for pressurizing the low-pressure brake fluid in the reservoir and supplying pressurized brake fluid to said high-pressure brake fluid output line during operation of the pump;

means for preventing flow of pressurized brake fluid in the high-pressure brake fluid output line into the accumulator during operation of the pump until hydraulic pressure inside the high-pressure brake fluid output line exceeds the hydraulic pressure in the accumulator by a predetermined amount and for permitting flow of pressurized brake fluid in the high-pressure brake fluid output line into the accumulator during operation of the pump when the hydraulic pressure inside the high-pressure brake fluid output line exceeds the hydraulic pressure in the accumulator by said predetermined amount.

12. An auxiliary hydraulic pressure source device according to claim 11, including a hydraulic pump-driving device connected to said hydraulic pump for driving said hydraulic pump.

13. An auxiliary hydraulic pressure source device according to claim 12, wherein said means includes a first one-way valve disposed between said accumulator and said high-pressure brake fluid output line, said one-way valve permitting flow of pressurized brake fluid in said high-pressure brake fluid output line to said accumulator only when the hydraulic pressure in the high-pressure brake fluid output line exceeds the hydraulic pressure in the accumulator by said predetermined amount.

14. An auxiliary hydraulic pressure source device according to claim 13, including a second one-way valve disposed between said high-pressure brake fluid output line and said accumulator for permitting passage of brake fluid from said accumulator to said high-pressure brake fluid output line when the hydraulic pressure inside said high-pressure brake fluid output line is lower than the hydraulic pressure inside said accumulator.

15. An auxiliary hydraulic pressure source device according to claim 13, including a one-way valve disposed between said high-pressure brake fluid output line and said accumulator for permitting passage of brake fluid from said accumulator to said high-pressure brake fluid output line when the hydraulic pressure inside said high-pressure brake fluid output line is lower than the hydraulic pressure inside said accumulator.

16. An auxiliary hydraulic pressure source device according to claim 11, including a pump driving device connected to said pump for driving said pump.

17. An auxiliary hydraulic pressure source device according to claim 11, including a sensor operatively associated with the accumulator for determining the hydraulic pressure inside said accumulator, said sensor being connected to a control means which receives a signal from the sensor indicating the hydraulic pressure inside said accumulator for controlling operation of the hydraulic pump-driving device.

18. An antilock brake system for an automotive vehicle according to claim 1, including a branch line extending from the high-pressure brake fluid output line and connected to the accumulator, said means including valve means located in the branch line.

19. An auxiliary hydraulic pressure source device according to claim 9, wherein said high-pressure brake fluid output line connects the pump with a hydraulic booster.

20. An auxiliary hydraulic pressure source device according to claim 11, wherein said high-pressure brake fluid output line connects the pump with a hydraulic booster, said means for preventing flow of pressurized brake fluid including valve means disposed between the high-pressure brake fluid output line and the accumulator for preventing the flow of the pressurized brake fluid in the high-pressure brake fluid output line into the accumulator during operation of the pump until hydraulic pressure inside the high-pressure brake fluid output line exceeds the hydraulic pressure in the accumulator by the predetermined amount so that the pressurized brake fluid produced by operation of the pump is supplied to the hydraulic booster.

* * * * *